US010089263B2

United States Patent
Loh et al.

(10) Patent No.: US 10,089,263 B2
(45) Date of Patent: Oct. 2, 2018

(54) SYNCHRONIZATION OF INTERRUPT PROCESSING TO REDUCE POWER CONSUMPTION

(71) Applicants: INTEL CORPORATION, Santa Clara, CA (US); Thiam Wah Loh, Singapore (SG); Gautham N. Chinya, Hillsboro, OR (US); Per Hammarlund, Hillsboro, OR (US); Reza Fortas, Villeneuve Loubet (FR); Hong Wang, Santa Clara, CA (US); Huajin Sun, Xi'an, Shaanxi (CN)

(72) Inventors: Thiam Wah Loh, Singapore (SG); Gautham N. Chinya, Hillsboro, OR (US); Per Hammarlund, Hillsboro, OR (US); Reza Fortas, Villeneuve Loubet (FR); Hong Wang, Santa Clara, CA (US); Huajin Sun, Xi'an (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/118,501

(22) PCT Filed: Mar. 24, 2014

(86) PCT No.: PCT/CN2014/073926
§ 371 (c)(1),
(2) Date: Aug. 12, 2016

(87) PCT Pub. No.: WO2015/143594
PCT Pub. Date: Oct. 1, 2015

(65) Prior Publication Data
US 2017/0161096 A1 Jun. 8, 2017

(51) Int. Cl.
*G06F 13/24* (2006.01)

(52) U.S. Cl.
CPC ...... *G06F 13/24* (2013.01); *G06F 2213/2404* (2013.01); *G06F 2213/2406* (2013.01); *Y02D 10/14* (2018.01)

(58) Field of Classification Search
None
See application file for complete search history.

(56) References Cited

U.S. PATENT DOCUMENTS 5,363,506 A * 11/1994 Fukuoka .............. G06F 9/4812
710/267
5,388,265 A * 2/1995 Volk ..................... G06F 1/3215
713/321

(Continued)

FOREIGN PATENT DOCUMENTS

EP 2166457 3/2010
JP 2009-098972 5/2009

(Continued)

OTHER PUBLICATIONS

International Searching Authority, "Notification of Transmittal of the International Search Report and the Written Opinion of the International Searching Authority," dated Oct. 9, 2014 in International application No. PCT/CN2014/073926.

(Continued)

*Primary Examiner* — Elias Mamo
(74) *Attorney, Agent, or Firm* — Trop, Pruner & Hu, P.C.

(57) ABSTRACT

A processor is disclosed and includes at least one core including a first core, and interrupt delay logic. The interrupt delay logic is to receive a first interrupt at a first time and delay the first interrupt from being processed by a first time delay that begins at the first time, unless the first interrupt is pending at a second time when a second interrupt is processed by the first core. If the first interrupt is pending at the second time, the interrupt delay logic is to indicate to the first (Continued)

core to begin to process the first interrupt prior to completion of the first time delay. Other embodiments are disclosed and claimed.

18 Claims, 8 Drawing Sheets

(56) References Cited

U.S. PATENT DOCUMENTS

| | | | | |
|---|---|---|---|---|
| 5,708,817 | A * | 1/1998 | Ng | G06F 13/24 |
| | | | | 710/260 |
| 5,905,913 | A * | 5/1999 | Garrett | G06F 13/24 |
| | | | | 710/49 |
| 6,065,089 | A * | 5/2000 | Hickerson | G06F 9/4825 |
| | | | | 710/266 |
| 6,115,779 | A * | 9/2000 | Haubursin | G06F 13/24 |
| | | | | 710/260 |
| 6,477,600 | B1 * | 11/2002 | Baxter | G06F 9/4825 |
| | | | | 710/260 |
| 6,529,986 | B1 | 3/2003 | Chen et al. | |
| 7,478,186 | B1 | 1/2009 | Onufryk et al. | |
| 2010/0077394 | A1 * | 3/2010 | Wang | G06F 9/45533 |
| | | | | 718/1 |
| 2011/0213906 | A1 | 9/2011 | Gustafsson et al. | |
| 2012/0079482 | A1 | 3/2012 | Wang et al. | |
| 2012/0284444 | A1 | 11/2012 | Gupta et al. | |
| 2014/0095851 | A1 * | 4/2014 | Gerwig | G06F 9/3865 |
| | | | | 712/244 |

FOREIGN PATENT DOCUMENTS

| | | |
|---|---|---|
| JP | 2012-203519 | 10/2012 |
| JP | 2013-543613 | 12/2013 |
| KR | 10-2013-0048786 | 5/2013 |

OTHER PUBLICATIONS

Japan Intellectual Property Office, Notification of Reasons for Refusal dated Jul. 13, 2017, in Japanese Patent Application No. 2016-550205.
Korea Intellectual Property Office, Notice of Preliminary Rejection dated Sep. 14, 2017, in Korean Patent Application No. 10-2016-7023040.
Patent Office of the Russian Federation, Office Action dated Oct. 19, 2017 in Russian Patent Application No. 2016134601.
Patent Office of the Russian Federation, Official Decision of Grant dated Feb. 7, 2018 in Russian Patent Application No. 2016134601. (Redacted).
European Patent Office, Extended European Search Report dated Oct. 25, 2017 in European Patent Application No. 14887397.9.
Korean Intellectual Property Office, Notice of Final Rejection dated Mar. 30, 2018 in Korean Patent Application No. 10-2016-7023040.
Japan Patent Office, Notification of Reasons for Refusal dated Mar. 30, 2018 in Japanese Patent Application No. 2016-550205.
State Intellectual Property Office of the People's Republic of China, First Office Action dated Jul. 5, 2018 in Chinese Application No. 201480076274.7.

* cited by examiner

SYNCHRONIZATION OF INTERRUPT PROCESSING TO REDUCE POWER CONSUMPTION

TECHNICAL FIELD

Embodiments relate to interrupt processing.

BACKGROUND

Devices such as portable devices, e.g., smart phones, tablets, etc., may have a high rate of asynchronous events that occur as a result of a diversity of peripheral devices that may provide input. For example, asynchronous events may include motion sensors, light sensors, touch screen, etc. Additionally these portable devices may receive synchronous events such as periodic interrupts related to cellular network paging, periodic timer events, etc.

Interrupt messages ("interrupts"), which are associated with synchronous and asynchronous events, input to a processor may cause the processor to thrash, e.g., oscillate excessively between an active state and an inactive state, which may in turn cause high power consumption due to "wake-up" power costs as a result of transitions from the inactive to the active state, which can result in a reduction in time period between recharges of a power source, e.g., battery.

DETAILED DESCRIPTION

Interrupt sources can be classified according to characteristics of a source and requirements for processing interrupts received from the source. For example, some interrupts are to be serviced without intentional delay before processing ("hard interrupts" or "critical interrupts" herein, e.g., periodic interrupts associated with, e.g., cellular transmission standards). Other interrupts ("soft interrupts" or "non-critical interrupts" herein) are less time sensitive and can be intentionally delayed, with a time delay to be assigned according to a nature of the interrupt source, e.g., peripheral device/application.

In embodiments, a programmable delay value can be established for each event or group of events. Interrupts can be grouped so that a processor can handle (e.g., "batch process") a plurality of interrupts when the processor is activated ("awakened") from an inactive ("sleep") state. Batch processing of interrupts can reduce a total count of active/inactive cycles that the processor experiences in a given time frame, which can lower overall power usage of the processor.

In embodiments, a programmed delay timer value is available for an operating system to delay interrupt processing (for example, via execution of a handler associated with the interrupt), e.g., when the processor and/or a system on a chip (SoC) is in a power saving (inactive) state, e.g., one of advanced computing and power interface (ACPI) powered-down states, C1-C6. Programmed delay values for various types of interrupts enables interrupt processing to be batch processed instead of processing each interrupt individually that could cause a large power consumption due to each inactive-to-active transition of the processor or SoC. In an embodiment, interrupt processing automatically groups events dynamically based on the corresponding delay time assigned to each interrupt.

Figure 1:
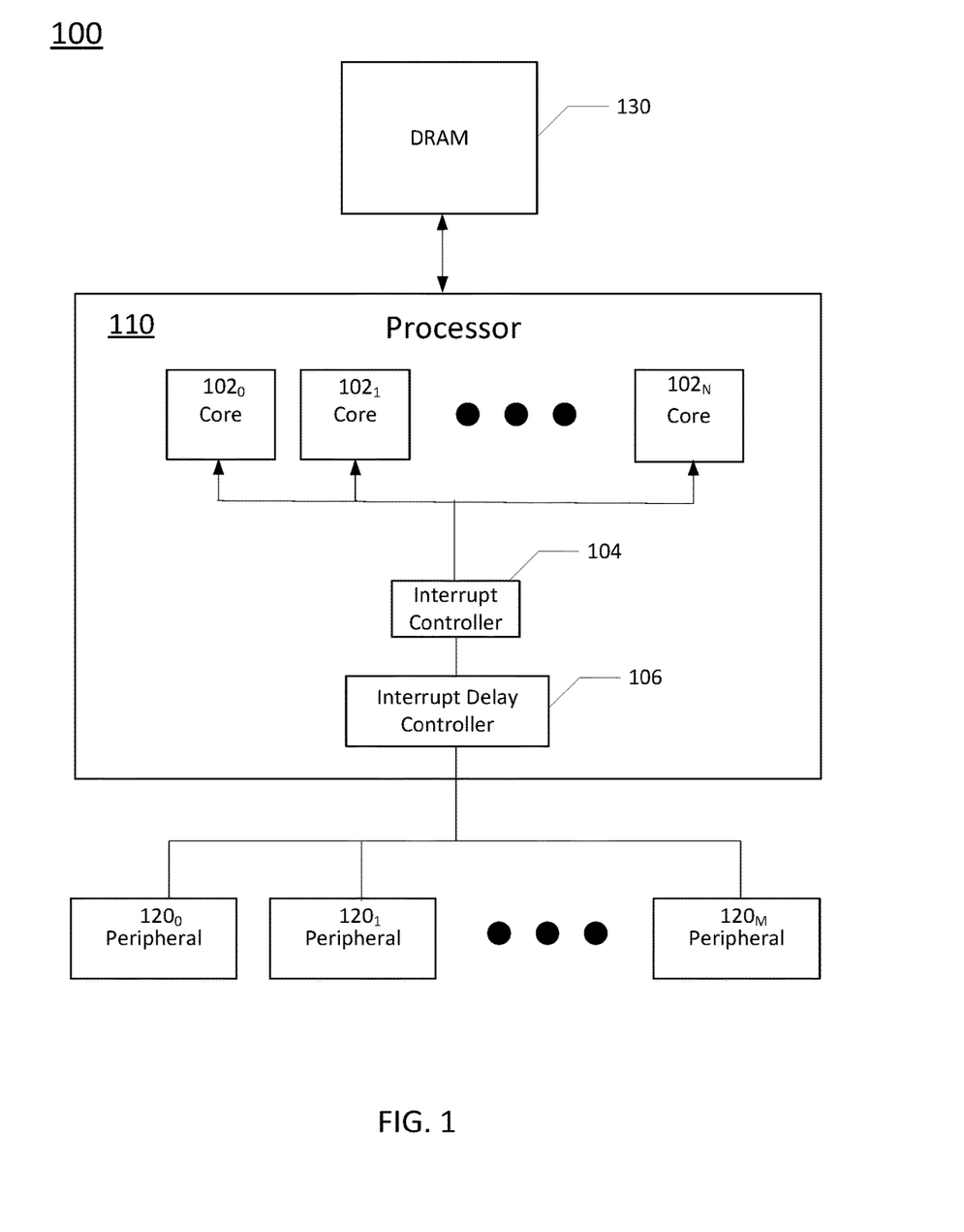
FIG. 1 is a block diagram of a system, according to an embodiment of the present invention.

FIG. 1 is a block diagram of a system 100, according to an embodiment of the present invention. The system 100 includes a processor 110 that includes one or more cores $102_0$-$102_N$, an interrupt controller 104, and an interrupt delay controller 106, a plurality of peripheral devices $120_0$-$120_M$ coupled to the processor 110, and a dynamic random access memory (DRAM) 130 coupled to the processor 110.

In operation, the processor 110 may receive interrupt messages (also "interrupts" herein) from one or more of the peripheral devices $120_0$-$120_M$. One or more of the interrupts ("hard interrupt") may be associated with a corresponding hard real-time interrupt event for which the interrupt is to be processed when received, e.g., not intentionally delayed. For instance, a hard interrupt may be associated with a periodic event related to a cellular standard, and the hard interrupt is to be processed by the processor 110 upon receipt, e.g., without intentional time delay.

Other interrupts may be periodic (e.g., synchronous) or aperiodic (e.g., asynchronous) but are not associated with hard real-time interrupt events, and therefore processing of such interrupts ("soft interrupts") may be delayed, e.g., intentionally time delayed. For example, asynchronous interrupts may be associated with asynchronous events such as sensor input, touch screen, data that may be received aperiodically, etc.

For each peripheral device $120_0$-$120_M$ that creates soft events (e.g., produces soft interrupts), a corresponding time delay to process each soft interrupt may be assigned. The time delay to process soft interrupts received from a source peripheral device may be determined based on characteristics of the source peripheral device, and may be determined prior to use of the system 100. For example, one factor to be considered in determination of an acceptable time delay for soft interrupts may be a worst case frequency of occurrences of the associated event. For example if, in a worst case estimate, an event occurs every 100 milliseconds, a delay of 100 µs to process the associated interrupt would have a negligible performance impact. The time delay may be provided (e.g., stored in the processor 110) prior receipt of one or more interrupts by the processor 110.

Hard interrupts received by the interrupt delay controller 106 from one or more of the peripheral devices $120_0$-$120_M$ may be passed to the interrupt controller 104 to be processed without intentional time delay. When a soft interrupt is received by the processor 110, the interrupt delay controller 106 may select a corresponding time delay (e.g., stored in the interrupt delay controller 106) based on the peripheral device 120 that has provided the soft interrupt. For each soft interrupt received, the interrupt delay controller may commence a count of the corresponding time delay, e.g., via a corresponding timer, and when the corresponding timer has reached the end of the time delay, the soft interrupt may be released to the interrupt controller 104 and directed by the interrupt controller 104 to be processed by one of the cores $102_0$-$102_N$.

In an embodiment, when a hard interrupt is received by the processor 110 for immediate processing, the interrupt delay controller 106 may determine whether any soft interrupts are pending, e.g., an associated timer has begun to count the time delay for the soft interrupt and has not completed its count. The interrupt delay controller 106 may release one or more pending soft interrupts to the interrupt controller 104 for processing by one of the cores $102_0$-$102_N$, e.g., without completion of the count of the associated timer. Interrupts that are released for processing by a core are to be processed while the core is active, e.g., the core remains active from a time at which the hard interrupt is received until processing of all soft interrupts that are released is complete.

In another embodiment, a first soft interrupt is to be processed by a first core of the cores $102_0$-$102_N$, due to expiration of the timer, e.g., the associated timer has completed its count of the respective time delay. The interrupt delay controller 106 may release one or more other pending soft interrupts to the interrupt controller 104 for processing by the first core prior to completion of each respective time delay. Interrupts that are released for processing by the first core are to be batch processed, e.g., processed while the first core is active as a result of processing of the first soft interrupt. The core is to remain active until processing of the interrupts that have been released is complete.

In each of the above described embodiments, when a particular interrupt sent to the interrupt controller to be processed, the interrupt delay controller 106 may release one or more pending interrupts to be processed during a single active time period of the core. Therefore, the particular core does not oscillate between inactive and active state for each interrupt to be processed. Batch processing of the interrupt scan reduce thrashing and can reduce power usage of the processor that would otherwise be expended due to "wakeup" power costs. That is, by batch processing the interrupts, the power expended to re-activate the core may be reduced from multiple instances of wakeup to a single wakeup instance for multiple interrupts to be processed.

Figure 2:
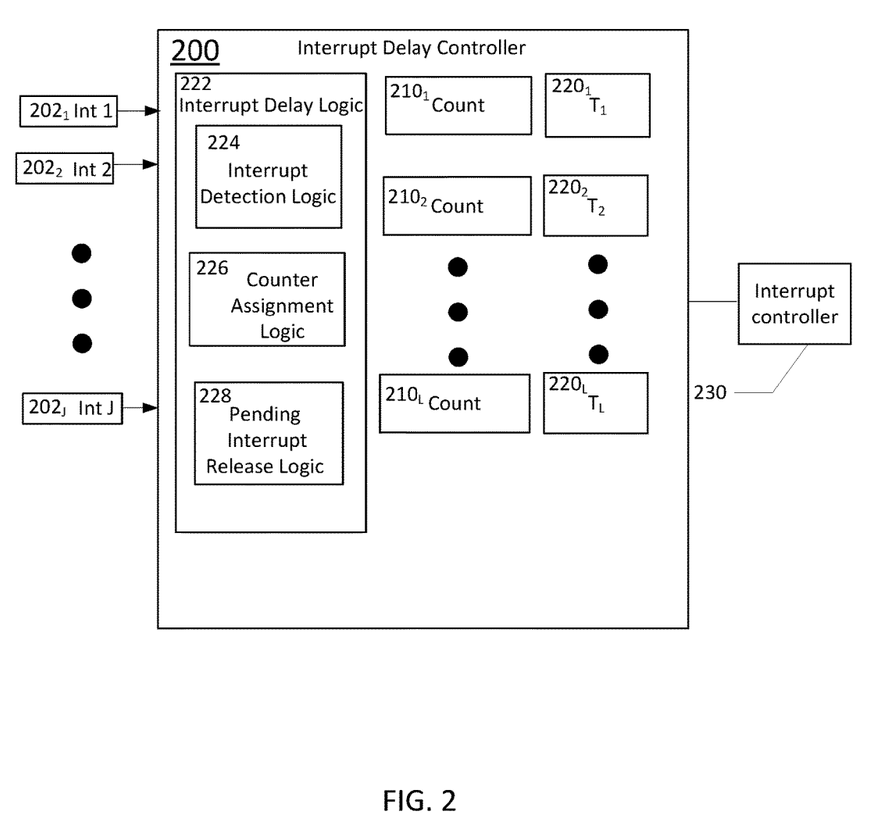
FIG. 2 is a block diagram of an interrupt delay controller, according to embodiments of the present invention.

FIG. 2 is a block diagram of an interrupt delay controller 200, according to embodiments of the present invention. The interrupt delay controller 200 includes time delay counters $210_1$-$210_L$, time delay registers $220_1$-$220_L$, and interrupt delay logic 222 that includes interrupt detection logic 224, counter assignment logic 226, and pending interrupt release logic 228. The interrupt delay logic 222 including the interrupt detection logic 224, the counter assignment logic 226, and the pending interrupt release logic 228 may be implemented in software, hardware, firmware, or a combination thereof.

In operation, a plurality of peripheral devices may generate interrupts $202_1$-$202_J$. Some of the interrupts received from some peripheral devices may be hard interrupts, e.g., to be processed without intentional delay. Other interrupts may be soft interrupts and may be delayed prior to processing.

The interrupt detection logic 224 may detect each hard interrupt that is received, and may send each hard interrupt to the interrupt controller 230 without delay, to be output to a particular core for processing.

Each counter $210_1$-$210_L$ has an associated time delay register $210_1$-$210_L$ that stores a determined time delay corresponding to a particular peripheral device that issues soft interrupts. The time delay for a given peripheral device may be stored in the associated time delay register $210_1$-$210_L$ (e.g., prior to operation of the interrupt delay controller 200) and may be dependent on a plurality of factors (e.g., performance impact), as described above. The counter assignment logic 226 may assign each interrupt received from a particular peripheral device to a corresponding counter $210_i$ whose time delay register $220_i$ is associated with the particular peripheral device. For example, when a first interrupt is received from a first peripheral device, the first interrupt may be assigned by the counter assignment logic 226 to a first timer $210_1$ that begins a time count to a first time delay value associated with the first peripheral device and stored in the register $220_1$ (e.g., countdown from the first time delay value, or count up to the first time delay value). When the time count has expired, the interrupt is released to an interrupt controller 230 for processing by a selected one of the cores determined by the interrupt controller 230.

The interrupt detection logic 224 may detect receipt of a hard interrupt and may direct the received hard interrupt to the interrupt controller 230 without intentional delay. Processing the hard interrupt may trigger the pending interrupt release logic 228 to release to the interrupt controller 230, prior to completion of the assigned time delay, one or more soft interrupts that are pending, e.g., being intentionally delayed via time delay counter 210.

Also, for each instance that a counter 210 completes its count of the associated time delay, the corresponding interrupt is released to the interrupt controller 230 to be processed by a particular core of the processor (the particular core determined by the interrupt controller 230). Release of the interrupt may cause the pending interrupt release logic 228 to release one or more pending interrupts to the interrupt controller 230, to be processed by the particular core.

Figure 3A:
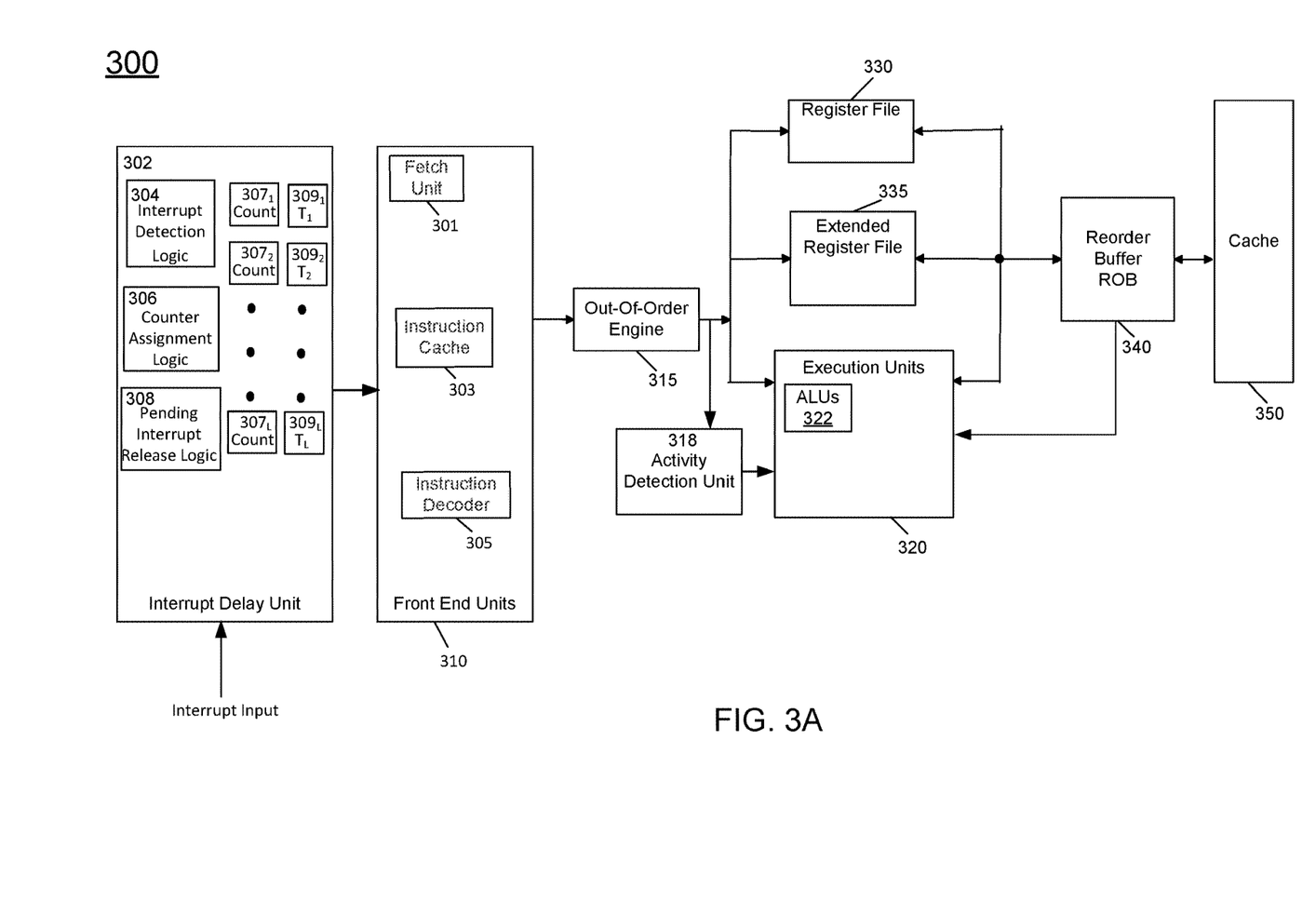
FIG. 3A is a block diagram of a processor core in accordance with an embodiment of the present invention.

Referring now to FIG. 3A, shown is a block diagram of a processor core 300 in accordance with one embodiment of the present invention. As shown in FIG. 3A, processor core 300 may be a multi-stage pipelined out-of-order processor.

Core 300 may include an interrupt delay unit 302, according to embodiments of the present invention. Interrupts may be received from various peripheral devices and interrupt detection logic 304 may detect whether a received interrupt is a hard interrupt or a soft interrupt. If the received interrupt is a hard interrupt, the received interrupt is sent to front end units 310 and is to be processed by execution units 320 without delay (e.g., without introduction of an intentional time delay). If the received interrupt is a soft interrupt, the interrupt detection logic 304 may indicate to counter assignment logic 306 to assign one of delay counters $307_1$-$307_L$ to the received interrupt. The assigned delay counter $307_i$ may count a determined time delay $T_i$, where $T_i$ is stored in a corresponding time delay register $309_1$-$309_L$, and the interrupt delay unit 302 may delay the received soft interrupt from being processed while the corresponding delay counter $307_i$ counts the respective time delay $T_i$.

If the received (soft) interrupt is pending (e.g., stalled by the interrupt delay unit 302 until the respective delay counter $307_i$ expires) when another interrupt is being processed (e.g., a hard interrupt, or another soft interrupt whose delay counter has expired), pending interrupt release logic 308 may cause the pending soft interrupt to be released for processing prior to expiration of its respective delay counter $307_i$ and while execution units 320 are active, according to embodiments of the present invention.

If no interrupts are being processed and no instructions are being processed, power adjustment logic 318 may indicate to execution units 320 to reduce power usage from a fully active level to a smaller level of power usage. When interrupts and/or instructions are queued up to be processed, the power adjustment logic 318 may indicate to the execution units 320 to resume a powered-up state.

As seen in FIG. 3A, core 300 includes front end units 310, which may be used to fetch instructions to be executed and prepare them for use later in the processor. For example, front end units 310 may include a fetch unit 301, an instruction cache 303, and an instruction decoder 305. In some implementations, front end units 310 may further include a trace cache, along with microcode storage as well as a micro-operation storage. Fetch unit 301 may fetch macro-instructions, e.g., from memory or instruction cache 303, and feed them to instruction decoder 305 to decode them into primitives, i.e., micro-operations for execution by the processor.

Coupled between front end units 310 and execution units 320 is an out-of-order (OOO) engine 315 that may be used to receive the micro-instructions and prepare them for execution. More specifically OOO engine 315 may include various buffers to re-order micro-instruction flow and allocate various resources needed for execution, as well as to provide renaming of logical registers onto storage locations within various register files such as register file 330 and extended register file 335. Register file 330 may include separate register files for integer and floating point operations. Extended register file 335 may provide storage for vector-sized units, e.g., 256 or 512 bits per register.

Various resources may be present in the execution units 320, including, for example, various integer, floating point, and single instruction multiple data (SIMD) logic units, among other specialized hardware. For example, such execution units may include one or more arithmetic logic units (ALUs) 322, among other such execution units.

Results from the execution units may be provided to retirement logic, namely a reorder buffer (ROB) 340. More specifically, ROB 340 may include various arrays and logic to receive information associated with instructions that are executed. This information is then examined by ROB 340 to determine whether the instructions can be validly retired and result data committed to the architectural state of the processor, or whether one or more exceptions occurred that prevent a proper retirement of the instructions. Of course, ROB 340 may handle other operations associated with retirement.

As shown in FIG. 3A, ROB 340 is coupled to a cache 350 which, in one embodiment may be a low level cache (e.g., an L1 cache) although the scope of the present invention is not limited in this regard. Also, execution units 320 can be directly coupled to cache 350. From cache 350, data communication may occur with higher level caches, system memory and so forth. While shown with this high level in the embodiment of FIG. 3A, understand the scope of the present invention is not limited in this regard. For example, while the implementation of FIG. 3A is with regard to an out-of-order machine such as of a so-called x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 3B:
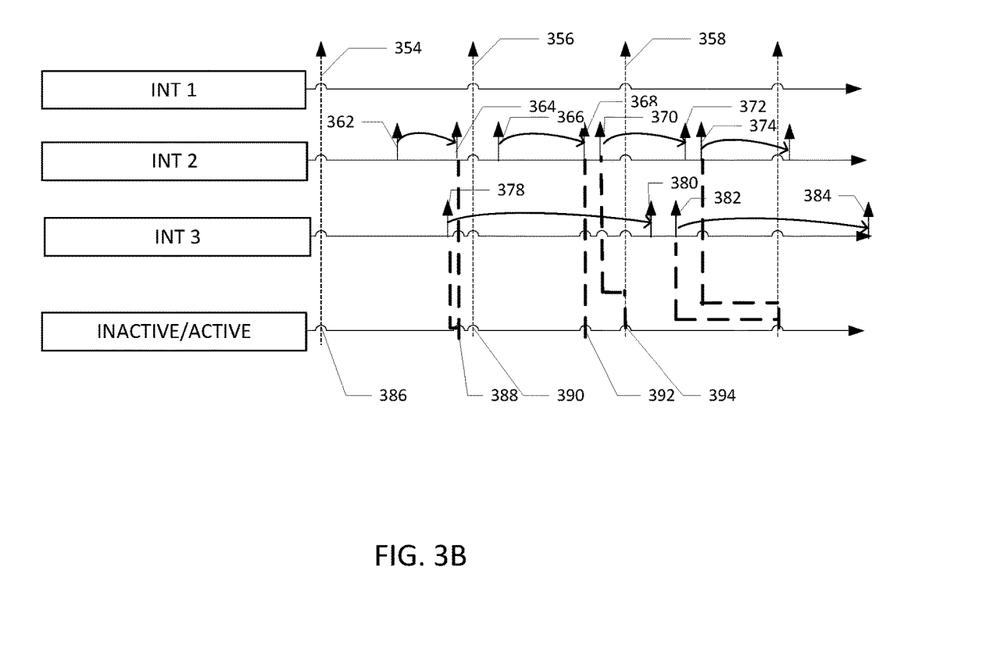
FIG. 3B is a timing diagram of interrupts to be processed according to embodiments of the present invention.

FIG. 3B is a timing diagram of interrupts to be processed, according to embodiments of the present invention.

Interrupt 1 messages (354-360) are hard interrupts. Interrupt 2 messages (362, 366, 370, 374) are soft interrupts that are periodic. Interrupt 3 messages (378, 382) are soft interrupts that are aperiodic.

All interrupts are to be processed by the same core. Soft interrupts may be delayed, with each soft interrupt having a corresponding time delay, as discussed above with regard to FIG. 2. Each of periodic soft interrupts 362, 366, 370, and 374 is delayed in time, to be processed as delayed interrupts 364, 368, 372, and 376, respectively. Each of asynchronous soft interrupts 378, 382 is delayed in time, to be processed as interrupts 380 and 384, respectively.

Each of hard interrupts 354-360 is to be processed without intentional delay, and each interrupt 354-360 is associated with an inactive-to-active transition (386, 390, 394, 396) in the core that processes the interrupts. Interrupts 354, 356, 358, and 360 are processed at core times 386, 390, 394, and 396, respectively.

As each interrupt 354, 356, 358, 360 is being processed, one or more pending interrupts (e.g., not yet processed and awaiting expiration of a corresponding time delay period) may be released to be processed while the core is in the active state. For example, interrupt 370 is delayed for processing to 372 (notated 370→372 herein), and is pending when interrupt 358 is processed. Hence, the interrupt (370→372) will be released for processing at time 394, the release triggered by processing of the interrupt 358. Thus, two interrupts (358 and 370→372) are to be processed in the same active period of the core that begins at 394.

Interrupt 374 is being delayed to 376 and is pending when interrupt 360 is to be processed, e.g., at time 396. Hence, the interrupt (374→376) will be released for processing during the period of core activity that begins at 396. Additionally, interrupt 382 is delayed to 384 and is pending when the interrupt 360 begins to be processed. Therefore, the interrupt (382→384) will be released for processing during the period of core activity that begins at 396. Thus, three interrupts, 360, (374→376), and (382→384), are to be processed during a continuously active period of the core that begins at 396.

Interrupt 366 is delayed for processing at 368. No other interrupt is scheduled to be processed in a time period between 366 and 368, and so the delayed interrupt (366→368) is to be processed at time 392, and processing causes the core to transition from inactive to active at time 392. The core is to return to an inactive state after the delayed interrupt (366→368) is processed.

Interrupt 362 is delayed to 364 (362→364). Asynchronous soft interrupt 378 is delayed to 380 (378→380). The delayed interrupt (362→364) is not pending while any other interrupt is due to be processed, and therefore will be processed at time 388, corresponding to 364, which is at the end of its time delay. Delayed interrupt (378→380) is pending at time 388 and therefore will be released for processing while the core is in the active state due to processing of delayed interrupt (362→364). Thus, two interrupts 364 and (378→380) are processed in one active period that begins at 388.

A total of 6 transitions (386→396) from inactive to active state of the core results from processing the 10 interrupts received. Hence, introduction of a time delay before processing of soft interrupt scan reduce a total count of inactive-to-active transitions of the core. Reduction in the number of inactive-to-active transitions of the core can reduce total power consumption due to a reduction of the power costs associated with inactive-to-active transitions of the core.

Figure 4:
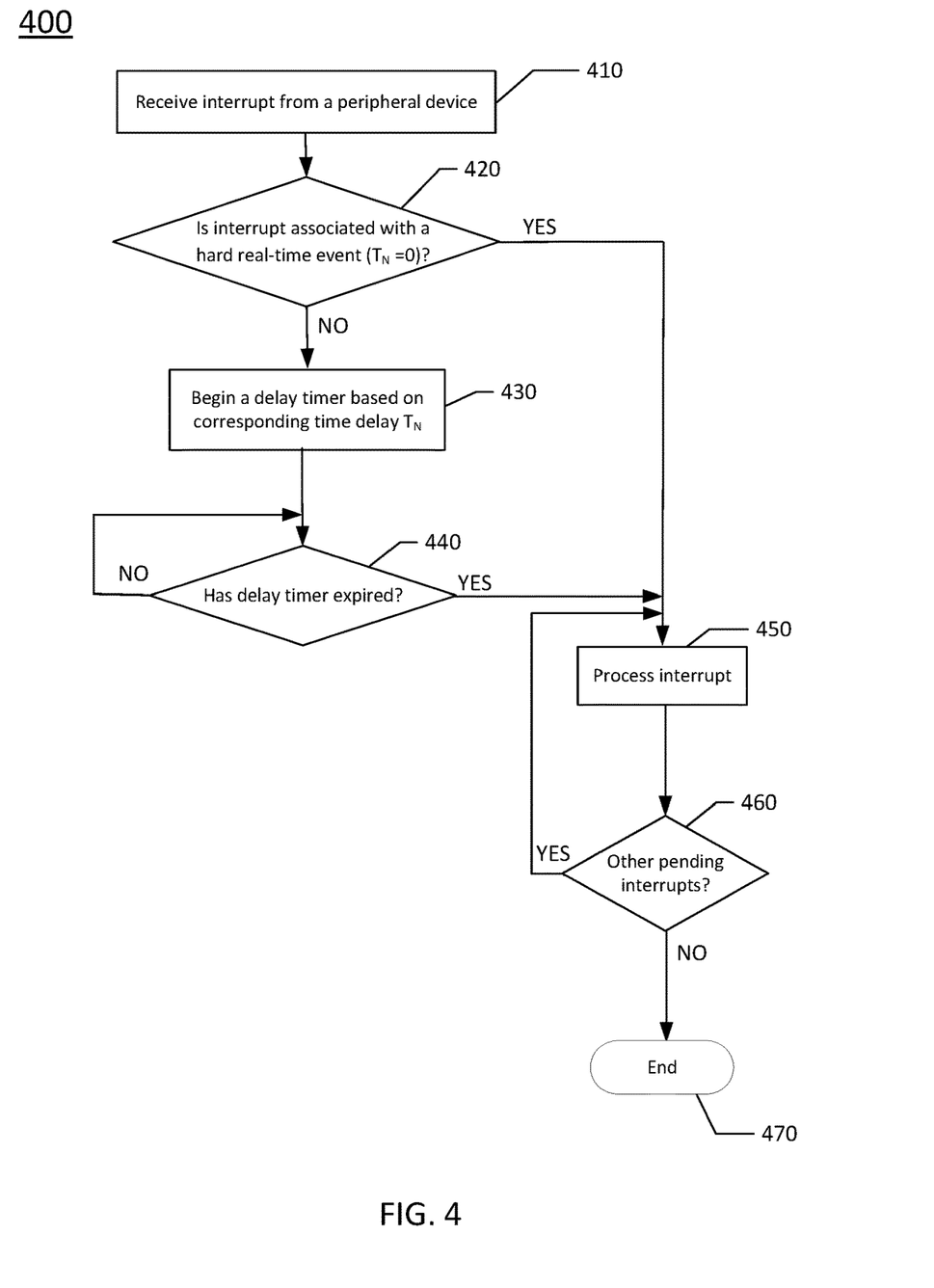
FIG. 4 is a flow diagram of a method of processing interrupt events by a processor, according to an embodiment of the present invention.

FIG. 4 is a flow diagram 400 of a method of processing interrupt events by a processor, according to an embodiment of the present invention. At block 410, the processor receives an interrupt from a peripheral device. Continuing to decision diamond 420, if the first interrupt is a hard interrupt, e.g., associated with a hard real-time event for which delay time $T_N=0$, advancing to block 450 the interrupt is processed by the processor with no intentional time delay. Advancing to decision diamond 460, if there are other pending interrupts, returning to block 450 the pending interrupts are processed. If, at decision diamond 460, there are no other pending interrupts, the method ends at 470.

If, at decision diamond 420, an $N^{th}$ interrupt is not a hard interrupt, e.g., the $N^{th}$ interrupt is not associated with a hard real time event, advancing to block 430, a corresponding delay timer begins to count a corresponding time delay $T_N$ of the $N^{th}$ interrupt. Moving to decision diamond 440, when the delay timer has expired, proceeding to block 450 the $N^{th}$ interrupt is processed. Advancing to decision diamond 460, if there are other pending interrupts when the $N^{th}$ interrupt is processed, returning to block 450 the pending interrupts are processed, e.g. prior to expiration of their respective delay times as a result of processing of the $N^{th}$ interrupt. If, at decision diamond 460, there are no other pending interrupts, the method ends at 470.

Figure 5:
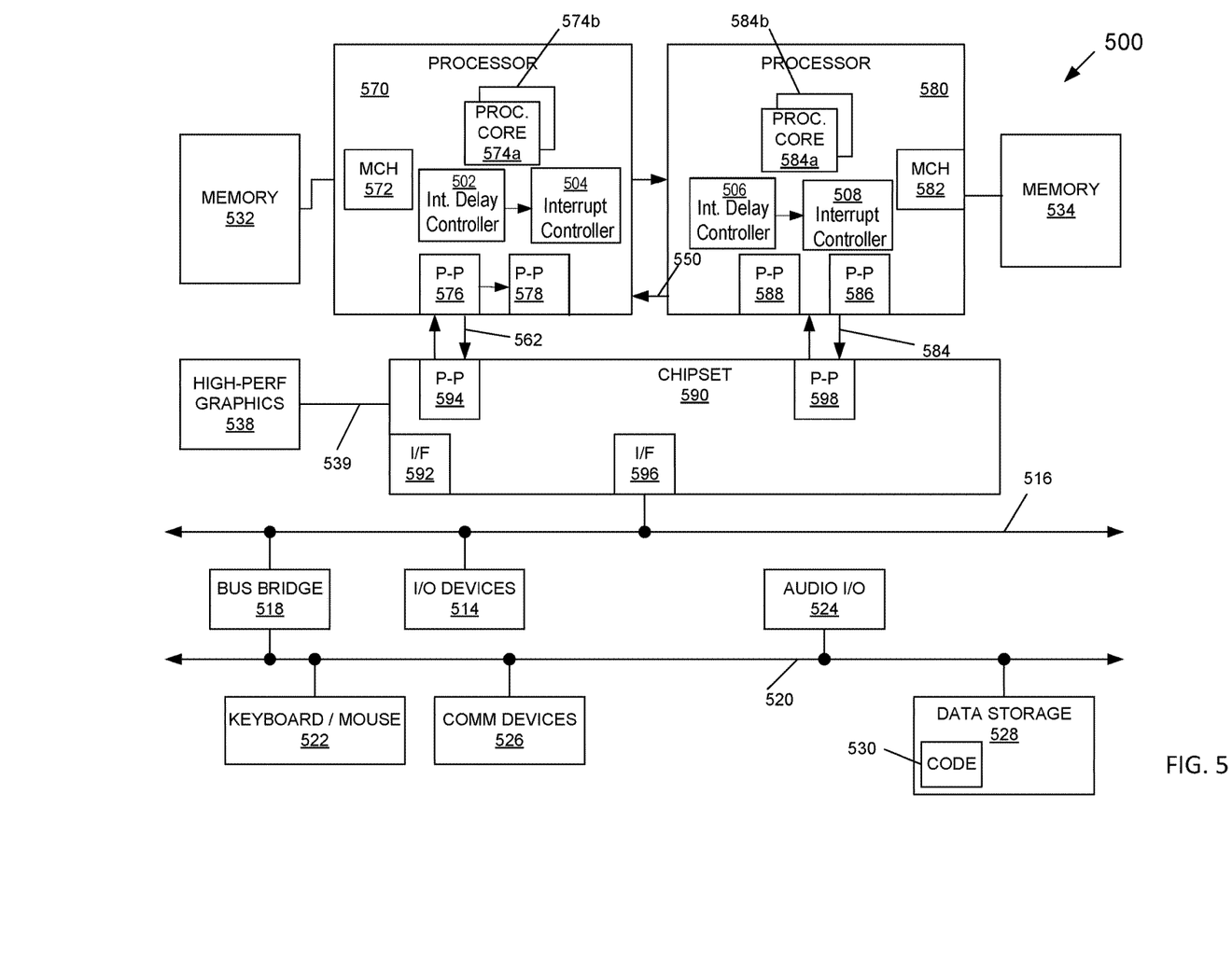
FIG. 5 is a block diagram of a system, according to an embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., cores 574a and 574b and cores 584a and 584b), although potentially many more cores may be present in the processors. Processor 570 includes an interrupt delay controller 502 and an interrupt controller 504, and processor 580 includes an interrupt delay controller 506 and an interrupt controller 508, according to embodiments of the present invention. Each interrupt delay controller 502, 506 is to detect incoming interrupts. If the incoming interrupt is associated with a hard real-time event, the interrupt is to be sent to the respective interrupt controller 504, 508 to be processed without intentional delay.

For a first interrupt that is a soft interrupt, the interrupt delay controller 502, 506 is to delay processing of the interrupt by a particular delay time before sending the first interrupt to the respective interrupt controller 504, 508 that directs the first interrupt to a core to be processed, unless the first interrupt is pending while a second interrupt is being processed. If the first interrupt is pending while the second interrupt is being processed, the interrupt delay controller 502, 506 is to send the first interrupt to the respective interrupt controller 504, 508 to be directed to the core for processing while the core is in an active state that is triggered by processing of the second interrupt, according to embodiments of the present invention.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCHs 572 and 582 couple the processors to respective memories, namely a memory 532 and a memory 534, which may be portions of system memory (e.g., DRAM) locally attached to the respective processors. First processor 570 and second processor 580 may be coupled to a chipset 590 via P-P interconnects 562 and 584, respectively. As shown in FIG. 5, chipset 590 includes P-P interfaces 594 and 598.

Furthermore, chipset 590 includes an interface 592 to couple chipset 590 with a high performance graphics engine 538 via a P-P interconnect 539. In turn, chipset 590 may be coupled to a first bus 516 via an interface 596. As shown in FIG. 5, various input/output (I/O) devices 514 may be coupled to first bus 516, along with a bus bridge 518, which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio input/output (I/O) 524 may be coupled to second bus 520. One or more of the devices 514, 522, 524, 526 may provide interrupts to be processed by processor 570 or processor 580, according to embodiments of the present invention. Embodiments can be incorporated into other types of systems including mobile devices such as a smart cellular telephone, tablet computer, netbook, Ultrabook™, or so forth.

Figure 6:
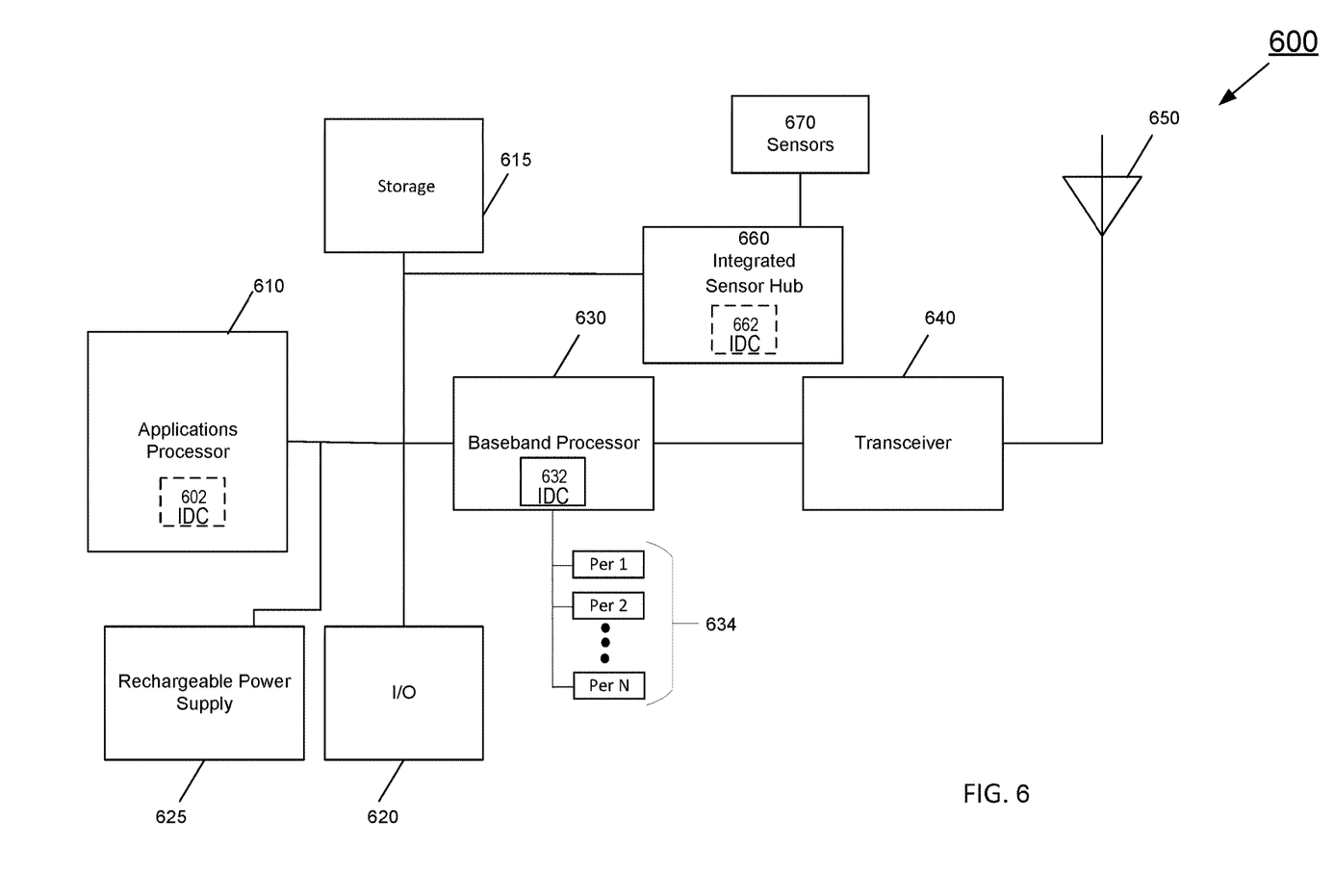
FIG. 6 is a block diagram of a system, according to another embodiment of the present invention.

Embodiments can be incorporated into other types of systems including mobile devices such as a cellular telephone. Referring now to FIG. 6, shown is a block diagram of a system in accordance with another embodiment of the present invention. As shown in FIG. 6, system 600 may be a mobile device and may include various components. As shown in the high level view of FIG. 6, an applications processor 610, which may be a central processing unit of the device, is in communication with various components, including a storage 615. Storage 615, in various embodiments, may include both program and data storage portions.

Applications processor 610 may further be coupled to an input/output system 620, which in various embodiments may include a display and one or more input devices such as a touch keypad, which itself can appear on the display when processed. The system 600 may also include an integrated sensor hub (ISH) 660 that may receive data from one or more sensors 670. In some embodiments the integrated sensor hub includes an interrupt delay controller (IDC) 662 to detect soft interrupts and delay execution of a soft interrupt by a corresponding delay time ($T_N$). If another interrupt is to be processed while an interrupt is pending, the interrupt is processed without completing its time delay, according to embodiments of the present invention.

The applications processor 610 may include an interrupt delay controller (IDC) 602, according to embodiments of the present invention. The IDC 602 may detect an incoming hard interrupt (e.g. from transceiver 640 and/or baseband processor 630) associated with a hard real-time event and may, without intentional delay, send the hard interrupt to an interrupt controller (not shown) that sends the interrupt to a core of the applications processor 610 to be processed (e.g., handled).

For a first interrupt that is a soft interrupt (e.g., received from I/O 620 and/or integrated sensor hub 660), the interrupt delay controller 602 may delay processing of the first interrupt by a first delay time before releasing the first interrupt to the interrupt controller unless the first interrupt is pending when a second interrupt is being processed at the first core. The interrupt controller is to send the first interrupt to a first core of the applications processor 610 to be processed. If the first interrupt is pending when the second interrupt is being processed at the first core, processing of the second interrupt triggers the interrupt delay controller 602 to send the first interrupt to the interrupt controller without completion of the time delay, to be directed to the first core for processing while the core is in an active state that is triggered by processing of the first interrupt, according to embodiments of the present invention. The second interrupt may be a hard interrupt or a soft interrupt whose time delay is complete (e.g., time delay counter has expired).

Applications processor 610 also may couple to baseband processor 630, which may condition signals such as voice and data communications for output, as well as conditioning incoming telephone and other signals. Baseband processor 630 may include IDC 632 that receives interrupts from peripheral devices 634, and that can delay execution of a received soft interrupt unless the soft interrupt is pending while another interrupt is processed, according to embodiments of the present invention. As seen, baseband processor 630 couples to transceiver 640, which may enable both receive and transmit capabilities. In turn, transceiver 640 may be in communication with an antenna 650, e.g., any type of antenna capable of transmitting and receiving voice and data signals via one or more communication protocols such as via a wireless wide area network (e.g., a 3G or 4G network) and/or a wireless local area network, such as a BLUETOOTH™ or so-called WI-FI™ network in accordance with an Institute of Electrical and Electronics Engineers 802.11 standard.

As seen, system 600 may further include a rechargeable power supply 625 having a rechargeable battery to enable operation in a mobile environment. While shown with this particular implementation in the embodiment of FIG. 6, the scope of the present invention is not limited in this regard.

Figure 7:
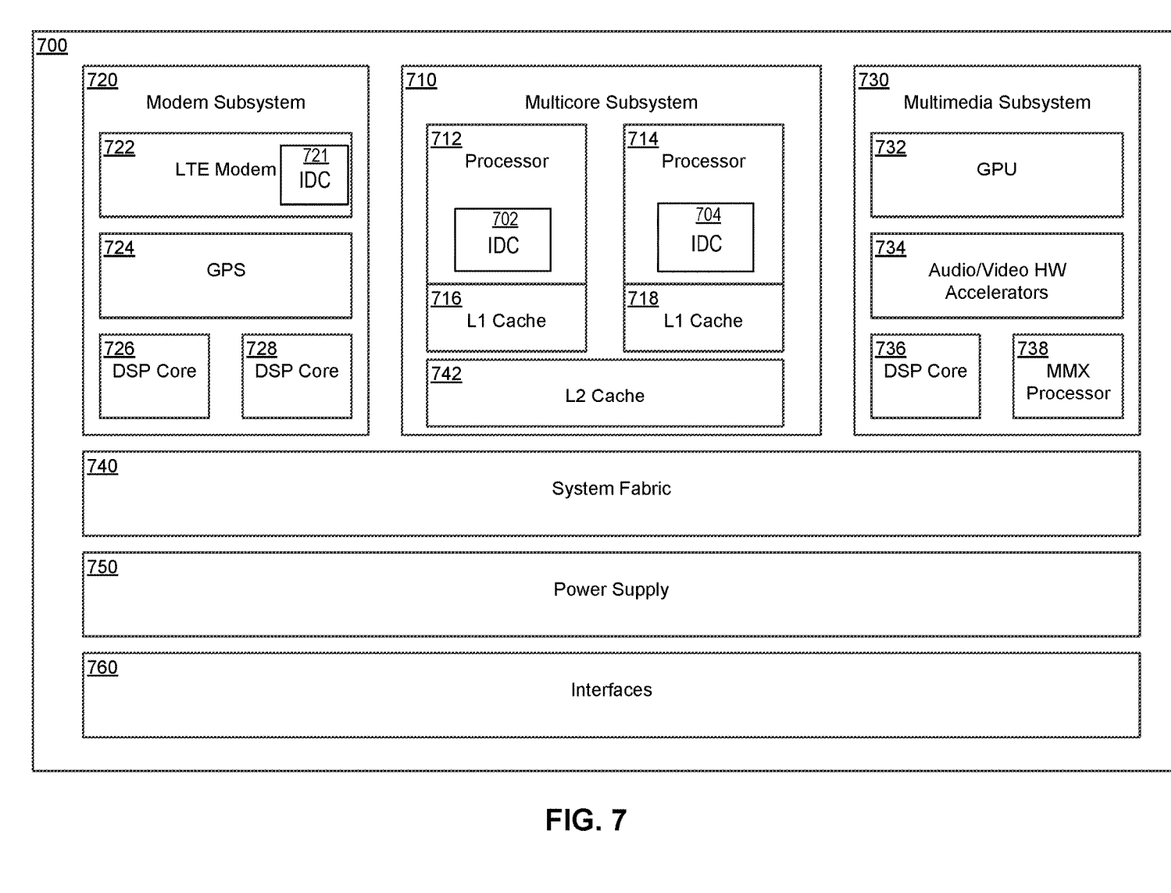
FIG. 7 is a block diagram of a system on a chip, according to an embodiment of the present invention.

FIG. 7 is a block diagram of a system on a chip (SOC) in accordance with embodiments of the present invention. The SOC 700 includes a multicore subsystem 710, a modem subsystem 720, a multimedia subsystem 730, system fabric 740, a power supply 750, and interfaces 760 to interface with one or more external devices. The SOC 700 may perform multiple tasks concurrently, e.g., modem tasks, multimedia tasks, and other processing tasks.

The multicore subsystem 710 includes multicore processors 712 and 714, L1 caches 716 and 718, and L2 cache 742. Each of the multicore processors 712 and 714 may include a corresponding interrupt delay controller (IDC) 702, 704. Each interrupt delay controller 702, 704 is to detect incoming hard interrupts associated with hard real-time events (e.g. from the interfaces 760) and upon receipt to send each hard interrupt to a respective interrupt controller (not shown) that directs the interrupt to a core of the respective processor 712, 714, to be processed.

For a first interrupt that is a soft interrupt (e.g., received from interfaces 760), the interrupt delay controller 702, 704, is to delay, by a first time delay, sending the first interrupt to the respective interrupt controller that is to direct the interrupt to a core to be processed, unless the first interrupt is pending while a second interrupt is being processed by the core. If the first interrupt is pending while the second interrupt is being processed by the core, the interrupt delay controller 702, 704 is to send the first interrupt to the interrupt controller without completion of the time delay, to be directed to the core for processing while the core is in an active state that is triggered by processing of the second interrupt, according to embodiments of the present invention.

The modem subsystem 720 may include Long Term Evolution (LTE) modem 722 for wireless communication of high speed data. The modem subsystem 720 may also include global positioning system (GPS) 724, and at least two digital signal processor (DSP) cores 726 and 728. The LTE modem 722 may include IDC 721 to detect interrupts input from the modem subsystem 720 (e.g., from GPS 724) and to delay soft interrupts, according to embodiments of the present invention.

The multimedia subsystem 730 may include a graphics processing unit (GPU) 732, audio/video hardware accelerators 734, a digital signal processing core 736, and an MMX processor 738, which may be capable of processing, e.g., single instruction, multiple data (SIMD) instructions.

Other embodiments are described below.

In a first example, a processor includes at least one core including a first core. The processor also includes interrupt delay logic to receive a first interrupt at a first time, delay, by a first time delay that begins at the first time, processing of the first interrupt by the first core unless the first interrupt is pending at a second time when processing of a second interrupt by the first core begins, and if the first interrupt is pending at the second time, indicate to the first core to begin to process the first interrupt prior to completion of the first time delay.

In a second example that includes the processor of example 1, the interrupt delay logic is to receive a plurality of interrupts that are pending at the second time including the first interrupt, and the first core is to process the plurality of pending interrupts during a first active period that commences at the second time, where the first core remains in an active state throughout the first active period.

In a third example that includes the processor of example 2, the first core is to transition from the active state to an inactive state after the second interrupt and the plurality of pending interrupts are processed.

In a fourth example that includes the processor of example 1, the first core is to remain in an active state while the first interrupt and the second interrupt are being processed and to transition to an inactive state after the first interrupt and the second interrupt are processed.

In a fifth example that includes the processor of example 1, the second interrupt is received periodically, and for each occurrence of the second interrupt received the second interrupt is to be processed by the first core without intentional delay and the interrupt delay logic is to indicate to the first core to commence processing of additional pending interrupts prior to completion of a corresponding time delay and while the core remains in an active state.

In a sixth example that includes the processor of example 5, for each occurrence of receipt of the second interrupt, upon completion of processing of the second interrupt and the additional pending interrupts, the first core is to transition to an inactive state.

In a seventh example that includes the processor of example 1, the interrupt delay logic is further to receive a third interrupt at a third time and assign to the third interrupt a second time delay, and the interrupt delay logic is to delay processing of the third interrupt from the third time by the second time delay unless the third interrupt is pending while the first interrupt or the second interrupt are being processed, and if the third interrupt is pending while the first interrupt or the second interrupt is being processed, indicate to the first core to process the third interrupt without completion of the second time delay.

In an eighth example that includes the processor of example 7, if the third interrupt is not pending while the first interrupt or the second interrupt is to be processed, the interrupt delay logic is to indicate to the core to process the third interrupt after completion of the second time delay.

In a 9th example that includes the processor of example 1, the interrupt delay logic includes a counter to count the first time delay.

In a tenth example, a system includes a dynamic random access memory (DRAM) and a processor that includes one or more cores, and an interrupt controller to direct each of one or more received interrupts to a first core of the one or more cores. The processor also includes an interrupt delay controller that includes one or more delay counters to count a respective time delay to process a corresponding interrupt, wherein each delay counter commences a respective count upon receipt by the processor of the corresponding non-critical interrupt, and pending interrupt release logic to, responsive to execution of another interrupt, send each pending interrupt to the interrupt controller to be directed to the first core while the first core is in an active state.

In an 11th example that includes the system of example 10, if no other interrupt is being processed during a respective time delay associated with a second interrupt, the interrupt delay controller is to send the interrupt to the interrupt controller upon completion of the count of the corresponding delay counter.

In a $12^{th}$ example that includes the system of example 10, wherein when the count of a second delay counter completes, the pending interrupt release logic is to send each pending interrupt to the interrupt controller to be processed while the first core is in the active state.

In a $13^{th}$ example that includes the system of example 10, after the pending interrupts are processed, the corresponding core is to become inactive.

In a $14^{th}$ example that includes the system of example 10, the processor further includes critical interrupt detection logic to, upon receipt of a hard interrupt, send the hard interrupt to the interrupt controller without intentional delay.

In a $15^{th}$ example that includes the system of example 10, the processor further includes counter assignment logic to assign a corresponding delay counter to each non-critical interrupt received.

In a $16^{th}$ example, a method includes processing a first interrupt by a core of a processor commencing at a first time, assigning, by the processor, a time delay to a second interrupt received at a second time, processing the second interrupt by the core after expiration of the time delay that begins at the second time, unless the second interrupt is pending at the first time, and if the second interrupt is pending at the first time, processing the second interrupt by the core prior to expiration of the time delay.

In a $17^{th}$ example that includes the method of example 16, if the second interrupt is pending at the first time, processing the second interrupt while the core is in an active state responsive to processing of the first interrupt.

In an $18^{th}$ example that includes the method of example 16, after the first interrupt and the second interrupt are processed, transitioning the core to an inactive state.

In a $19^{th}$ example that includes the method of example 16, if a plurality of interrupts are pending at the first time, sending the plurality of interrupts, prior to completion of a respective time delay of each of the plurality of interrupts, to the core to be processed by the core where the core is maintained in an active state while the plurality of interrupts are processed.

In a $20^{th}$ example that includes the method of example 19, after all pending interrupts are processed, transitioning the core to an inactive state.

In a $21^{th}$ example that includes the method of example 16, the time delay is determined based on one or more characteristics of a peripheral device from which the second interrupt is received.

In a $22^{th}$ example that includes the method of example 16, assigning a corresponding time delay to each of a plurality of interrupts, each of which is to be delayed from being processed by the corresponding by the corresponding time delay that begins from a respective received time, unless another interrupt is being processed.

In a $23^{rd}$ example that includes the method of example 22, when a particular interrupt begins to be processed, sending each pending interrupt to the core for processing without completion of the corresponding time delay.

In a $24^{th}$ example, an apparatus includes means to perform the method of any one of examples 16-23.

In a $25^{th}$ example, at least one computer-readable medium includes instructions that when executed enable a system to perform the method of any one of examples 16-23.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being processed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    at least one core including a first core; and
    interrupt delay logic to:
        receive a first interrupt at a first time;
        delay the first interrupt from being processed by a first time delay that begins at the first time unless the first interrupt is pending at a second time when a second interrupt is processed by the first core;
        if the first interrupt is pending at the second time, indicate to the first core to begin to process the first interrupt prior to completion of the first time delay;
        receive a third interrupt at a third time and assign to the third interrupt a second time delay;

delay processing of the third interrupt from the third time by the second time delay unless the third interrupt is pending while the first interrupt or the second interrupt is processed;

if the third interrupt is pending while the first interrupt or the second interrupt is processed, indicate to the first core to process the third interrupt without completion of the second time delay; and if the third interrupt is not pending while the first interrupt or the second interrupt is processed, indicate to the first core to process the third interrupt after completion of the second time delay.

2. The processor of claim 1, wherein when a plurality of received interrupts are pending at the second time, the first core is to process the plurality of pending interrupts during a first active period that commences at the second time, wherein the first core remains in an active state throughout the first active period.

3. The processor of claim 2, wherein the first core is to transition from the active state to an inactive state after the second interrupt and the plurality of pending interrupts are processed.

4. The processor of claim 1, wherein the first core is to remain in an active state while the first interrupt and the second interrupt are processed and to transition to an inactive state after the first interrupt and the second interrupt are processed.

5. The processor of claim 1, wherein when the second interrupt is received periodically, for each occurrence of the second interrupt received the second interrupt is to be processed by the first core without intentional delay and the interrupt delay logic is to indicate to the first core that if there are additional pending interrupts, to begin to process the additional pending interrupts prior to completion of a corresponding time delay and while the first core remains in an active state.

6. The processor of claim 5, further comprising, for each occurrence of receipt of the second interrupt, upon completion of processing of the second interrupt and the additional pending interrupts, the first core is to transition to an inactive state.

7. The processor of claim 1, wherein the interrupt delay logic includes a counter to count the first time delay.

8. A system comprising:
a dynamic random access memory (DRAM); and
a processor comprising:
one or more cores;
an interrupt controller coupled to the one or more cores to direct each of one or more received interrupts to a first core of the one or more cores; and
an interrupt delay controller coupled to the interrupt controller, the interrupt delay controller including:
one or more delay counters to count a respective time delay to process a corresponding interrupt of a first interrupt type, wherein each delay counter is to commence a respective count upon receipt by the processor of the corresponding interrupt;
pending interrupt release logic to, responsive to a first interrupt being processed, send each pending interrupt of the first interrupt type to the interrupt controller prior to expiration of the respective time delay, wherein the interrupt delay controller is to send the first interrupt to the interrupt controller without intentional delay, the first interrupt of a second interrupt type;
wherein the interrupt delay controller is to:

delay processing of another interrupt of the first interrupt type by a respective time delay unless the another interrupt is pending while the first interrupt or the each pending interrupt of the first interrupt type is processed;

if the another interrupt is pending while the first interrupt or the each pending interrupt of the first interrupt type is processed, indicate to the first core to process the another interrupt without completion of the respective time delay; and if the another interrupt is not pending while the first interrupt or the each pending interrupt of the first interrupt type is processed, indicate to the first core to process the another interrupt after completion of the respective time delay.

9. The system of claim 8, wherein if no interrupt is processed during a respective time delay associated with a second interrupt of the first interrupt type, the interrupt delay controller is to send the second interrupt to the interrupt controller upon completion of the count of the corresponding delay counter.

10. The system of claim 8, wherein when the count of a second delay counter completes, the pending interrupt release logic is to send each pending interrupt to the interrupt controller, to be processed while the first core is in the active state.

11. The system of claim 8, wherein after the pending interrupts are processed the corresponding core is to become inactive.

12. The system of claim 8, wherein the processor further includes interrupt detection logic to, upon receipt of a hard interrupt, send the hard interrupt to the interrupt controller without intentional delay.

13. The system of claim 8, wherein the processor further includes counter assignment logic to assign a corresponding delay counter to each soft interrupt received.

14. A method comprising:
processing a first interrupt of a first interrupt type by a core of a processor commencing at a first time, the first interrupt processed without intentional delay;
assigning, by the processor, a time delay to a second interrupt of a second interrupt type received at a second time;
processing the second interrupt by the core after expiration of the time delay that begins at the second time, unless the second interrupt is pending at the first time;
if the second interrupt is pending at the first time, processing the second interrupt by the core prior to expiration of the time delay;
delaying processing of a third interrupt of the second interrupt type until expiration of a second time delay unless the third interrupt is pending while the first interrupt or the second interrupt is processed;
if the third interrupt is pending while the first interrupt or the second interrupt is processed, indicating to the core to process the third interrupt without completion of the second time delay; and
if the third interrupt is not pending while the first interrupt or the second interrupt is processed, indicating to the core to process the third interrupt after completion of the second time delay.

15. The method of claim 14, wherein if the second interrupt is pending at the first time, processing the second interrupt while the core is in an active state responsive to processing of the first interrupt.

16. The method of claim 14, further comprising after the first interrupt and the second interrupt are processed, transitioning the core to an inactive state.

17. The method of claim 14, further comprising, if a plurality of interrupts of the second interrupt type are pending at the first time, sending the plurality of interrupts, prior to completion of a respective time delay of each of the plurality of interrupts, to the core to be processed by the core, wherein the core is maintained in an active state while the plurality of interrupts are processed.

18. The method of claim 17, further comprising, after all pending interrupts are processed, transitioning the core to an inactive state.

\* \* \* \* \*